United States Patent
Purser

(10) Patent No.: US 7,025,240 B2
(45) Date of Patent: *Apr. 11, 2006

(54) APPARATUS AND METHOD FOR BREAKING RAILS

(76) Inventor: Brian Purser, Caverswall Common, Stoke-on-Trent (GB) ST11 9EX ( * ) Notice: Subject to any disclaimer, the term of this patent is extended or adjusted under 35 U.S.C. 154(b) by 0 days.

This patent is subject to a terminal disclaimer.

(21) Appl. No.: 11/070,350

(22) Filed: Mar. 2, 2005

(65) Prior Publication Data

US 2005/0145084 A1    Jul. 7, 2005

Related U.S. Application Data

(63) Continuation of application No. 10/058,519, filed on Jan. 28, 2002, now Pat. No. 6,892,918.

(30) Foreign Application Priority Data

May 11, 2001  (GB) .................................... 0111519

(51) Int. Cl.
*B26F 3/00* (2006.01)
(52) U.S. Cl. .................... 225/103; 83/928; 83/DIG. 2; 241/198.1; 241/264
(58) Field of Classification Search ............... 83/928, 83/607, DIG. 2; 30/134; 241/198.1, 264, 241/269; 225/96.5, 103; 299/79.1, 85.1
See application file for complete search history.

(56) References Cited

U.S. PATENT DOCUMENTS

| | | |
|---|---|---|
| 3,846,908 A | 11/1974 | Allievi |
| 4,512,524 A | 4/1985 | Shigemizu |
| 4,669,187 A | 6/1987 | Pardoe |
| 4,720,032 A | 1/1988 | LaBounty |
| 4,776,093 A | 10/1988 | Gross |

(Continued)

FOREIGN PATENT DOCUMENTS

EP    0373403    *  6/1990

(Continued)

*Primary Examiner*—Stephen Choi
*Assistant Examiner*—Jason Prone
(74) *Attorney, Agent, or Firm*—Adams Evans P.A.

(57) ABSTRACT

An article breaking apparatus for being mounted on an arm of a vehicle, and including a first member having a first jaw on a first end thereof and a mounting attachment on a second end remote from the first jaw for permitting the apparatus to be mounted onto the vehicle arm. The first jaw includes an article-supporting surface. A second member is pivotally mounted for movement about a first pivot axis, the second member including a second jaw having an article-engaging surface cooperable with the article-supporting surface of the first jaw and defining an article receiving opening therebetween. The second jaw is movable about the first pivot axis relative to the first jaw between an article receiving position in which the article-supporting surface of the first jaw and the article-engaging surface of the second jaw diverge away from the first pivot axis and an article breaking position in which the article-supporting and article-engaging surfaces diverge toward the first pivot axis. The article-supporting surface of the first jaw is inclined relative to the first pivot axis, whereby, as the first and second jaws move from the article receiving position to the article breaking position, an article located between the first and second jaws will move along the article-supporting surface of the first jaw towards the first pivot axis by the movement of the second jaw against the article relative to the first jaw. The jaws are moved by a hydraulic piston and cylinder assembly. The apparatus is particularly useful for breaking railway rails.

6 Claims, 4 Drawing Sheets

U.S. PATENT DOCUMENTS

| | | |
|---|---|---|
| 4,818,005 A | 4/1989 | Purser |
| 4,838,493 A | 6/1989 | LaBounty |
| 4,908,946 A | 3/1990 | LaBounty |
| 4,951,886 A | 8/1990 | Berto |
| 4,961,716 A | 10/1990 | Hippely et al. |
| 5,004,168 A | 4/1991 | Purser |
| 5,044,569 A | 9/1991 | LaBounty et al. |
| 5,086,684 A | 2/1992 | Johnson |
| 5,127,567 A | 7/1992 | LaBounty et al. |
| 5,230,151 A | 7/1993 | Kunzman et al. |
| 5,241,249 A | 8/1993 | Detriche |
| 5,284,283 A | 2/1994 | LaBounty et al. |
| 5,292,079 A | 3/1994 | Zakohji |
| 5,384,962 A | 1/1995 | Pemberton |
| 5,636,802 A | 6/1997 | Tagawa |
| 5,671,892 A | 9/1997 | Morikawa et al. |
| 5,749,146 A | 5/1998 | Morikawa et al. |
| 5,946,830 A | 9/1999 | Ostermeyer |
| 6,061,911 A | 5/2000 | LaBounty et al. |
| 6,119,970 A | 9/2000 | LaBounty et al. |
| 6,298,560 B1 * | 10/2001 | Lee .............................. 30/134 |
| 6,839,969 B1 * | 1/2005 | Jacobson et al. ............. 30/134 |
| 6,892,918 B1 * | 5/2005 | Purser ........................ 225/103 |
| 2004/0094009 A1 * | 5/2004 | Purser .......................... 83/607 |

FOREIGN PATENT DOCUMENTS

| | | |
|---|---|---|
| GB | 2122125 | 1/1984 |
| GB | 2126938 | 4/1984 |

* cited by examiner

APPARATUS AND METHOD FOR BREAKING RAILS

TECHNICAL FIELD AND BACKGROUND OF THE INVENTION

This application is a continuation of U.S. application Ser. No. 10/058,519, filed Jan. 28, 2002 now U.S. Pat. No. 6,892,918 and claims priority based on an application filed in the United Kingdom on May 11, 2001, application number 0111519.5.

This invention relates to an apparatus and method, particularly but not exclusively useful for breaking railway rails.

The apparatus according to one embodiment of the invention is mounted on an hydraulically-powered arm of a suitable vehicle. The term "suitable vehicle" as used herein means a vehicle having an arm of one or more articulated portions, the arm being powered wholly or partially by hydraulic power. Examples of suitable vehicles include excavating vehicles having wheels or tracks and having an arm of one or more articulated portions. The arm is powered wholly or partially by hydraulic power and typically carries on its end a bucket for earth excavation or some other tool such as a pneumatic or percussion device or means for manipulating objects such as telephone poles, posts and the like.

Another example of a suitable vehicle for use with the invention may include a railway maintenance wagon having flanged wheels for running on the railway track, and having a similar articulated arm powered by hydraulic power.

It is known in the art to provide an arm on an excavating vehicle having a scrap shear provided thereon, the scrap shear apparatus being adapted to shear or cut a wide range of tough materials of differing properties and of differing sizes. However, the breaking up of steel rails such as used in railways present particular problems. The rails are of regular, and relatively small, cross-section and the breaking of such rails in a general purpose scrap shear apparatus is relatively slow and inefficient. Further, the rails are brittle, and have a tendency to shatter or splinter when being engaged by a shear attachment. The rails must be positioned for or fed into the shear apparatus which is a time consuming and potentially hazardous activity.

The present invention is particularly, but not exclusively, directed towards the breaking of rails as used on railway lines of the type having a substantially I-beam cross-section, including a wearing flange and a base flange interconnected by a web. The wearing flange, being the flange on which the carriage wheels run, has a thinner width and a thicker depth than the base flange, which is seated on the ground. Such rails are made to standardized dimensions of a hard material and are relatively brittle, with a tendency to shatter and splinter when broken. Such rails will be referred to as rails of the aforesaid type.

SUMMARY OF THE INVENTION

Therefore, it is an object of the invention to provide an apparatus for breaking elongate metal objects.

It is another object of the invention to provide an apparatus for breaking elongate metal objects such as railway rails in situ.

It is another object of the invention to provide an apparatus for breaking elongate metal objects such as railway rails into indeterminate lengths.

It is another object of the invention to provide an apparatus for breaking railway rails from a position on a parallel railway adjacent to the rail to be broken.

It is another object of the invention to provide a method for breaking railway rails.

These and other objects of the present invention are achieved in the preferred embodiments disclosed below by providing an article breaking apparatus mountable on an arm of a suitable vehicle, the apparatus including a first member having a first jaw on an end thereof and fixing means remote from said jaw. The fixing means permits mounting of the apparatus on the vehicle arm. The first jaw is provided with first and second article supporting surfaces. The first member includes a first pivot means, a second member pivotally mounted on the first pivot means about a first pivot axis and having a second jaw cooperable with the first jaw. The second jaw has an article engaging surface. The first and second jaws are movable relative to each other between an article receiving position in which the first article supporting surface and the article engaging surface diverge away from the first pivot axis, and an article breaking position in which said surfaces diverge toward the first pivot axis. The first and second article supporting surfaces are inclined relative to each other with the second article supporting surface closer to the first pivot axis, whereby, as the jaws move from the receiving position to the breaking position, an article located between the jaws will be urged towards the second article supporting surface and held thereagainst until broken by relative movement together of the first and second article supporting surfaces and the article engaging surface. The apparatus further includes means for moving said jaws between the receiving and breaking positions.

According to one preferred embodiment of the invention, the moving means preferably comprises a piston and cylinder assembly mounted on one of said first and second members.

According to another preferred embodiment of the invention, the piston and cylinder assembly is preferably hydraulically driven and may be driven by an hydraulic compressor of the vehicle to which the apparatus is attached in use.

According to yet another preferred embodiment of the invention, the article engaging surface includes a blade, which may preferably be removable.

According to yet another preferred embodiment of the invention, the cylinder of the piston and cylinder assembly is pivotally mounted on the first member, and the piston is pivotally connected at its end about a second pivot axis to the second member.

According to yet another preferred embodiment of the invention, the piston is connected to a slot or slots in the second member, and the end of the piston may include a pin extending through and slidably mounted in the slot or slots. Preferably the apparatus is arranged such that initially the pin moves towards the first pivot axis, and subsequently away from said axis, as the jaws move respectively from the receiving position to the article breaking position. Preferably the longitudinal axis of the or each slot extends substantially towards the first pivot axis.

According to yet another preferred embodiment of the invention, the fixing means may include second pivot means for pivoting the apparatus about a third pivot axis relative to a vehicle. The third pivot axis extends substantially through the first pivot axis, and may be perpendicular thereto. The third pivot axis further extends between the jaws in the receiving position. An actuating means is provided to pivot the apparatus about the third pivot axis.

According to yet another preferred embodiment of the invention, the actuating means is a rotary actuator.

According to yet another preferred embodiment of the invention, the first pivot means includes a thrust bearing, and includes a bearing pad which may be adjustable.

According to yet another preferred embodiment of the invention, the length of the jaws is preferably less than the height of the rail being broken so that the article engaging surface engages only a side of the wearing flange of the rail when the jaws move from the receiving to the breaking position.

According to yet another preferred embodiment of the invention, the first and second members preferably include surfaces forward of the jaws inclined at substantially 90° or less to the jaws, so that the apparatus may be used to break rails which may be lying on the ground.

According to yet another preferred embodiment of the invention, the apparatus is fitted onto a suitable vehicle.

An embodiment of the method according to the invention comprises the steps of bringing an apparatus according to the invention and fitted to a suitable vehicle into the vicinity of a rail, orientating the apparatus with respect to the rail so that the wearing flange is between the jaws, and operating the piston and cylinder assembly to move the jaws from the receiving position to the breaking position to break the rail.

BRIEF DESCRIPTION OF THE DRAWINGS

Some of the objects of the invention have been set forth above. Other objects and advantages of the invention will appear as the invention proceeds when taken in conjunction with the following drawings, in which.

DESCRIPTION OF THE PREFERRED EMBODIMENT AND BEST MODE

Figure 1:
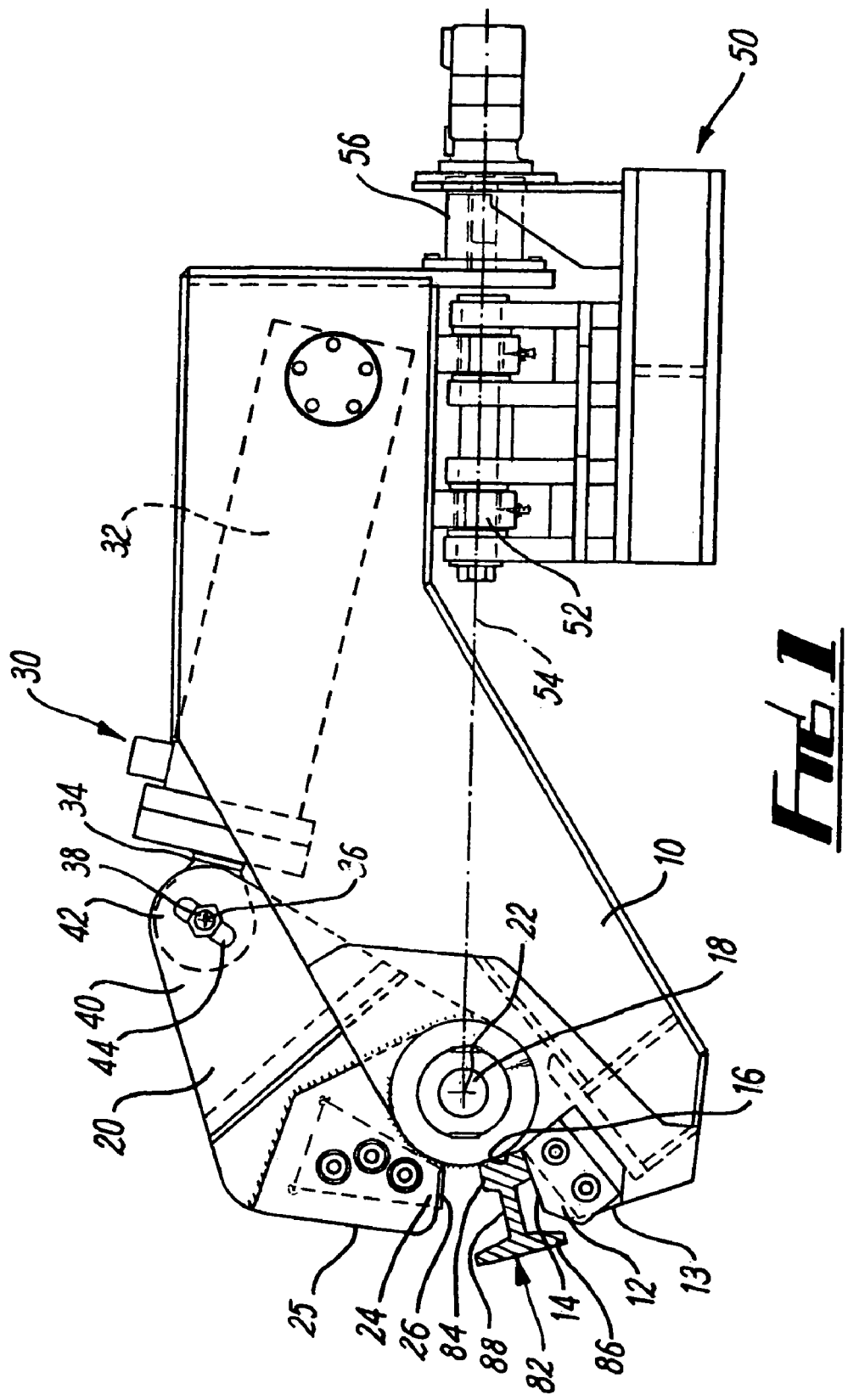
FIG. 1 is a side view of an article breaking apparatus with its jaws in an article receiving position.
Figure 2:
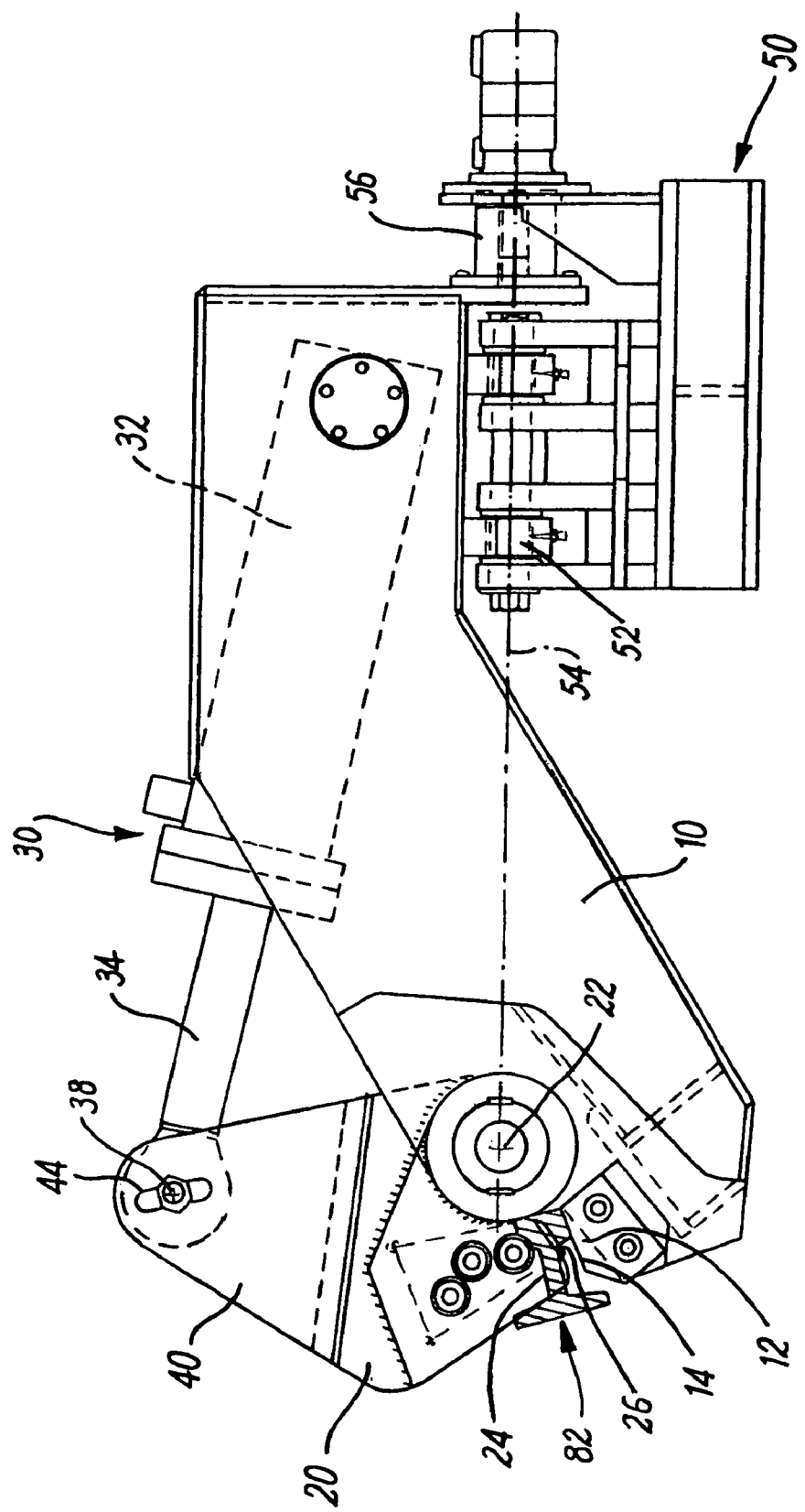
FIG. 2 is a view similar to FIG. 1 with the jaws in an article breaking position.

Referring now specifically to the drawings, an article breaking apparatus according to the present invention is illustrated in FIGS. 1 and 2.

FIGS. 1 and 2 show an article breaking apparatus including a first member 10 having a first jaw 12. The first jaw 12 includes first and second generally mutually perpendicular article supporting surfaces 14, 16. First member 10 includes a first pivot means 18 about a first pivot axis 22. The second member 20 is pivotally mounted on first pivot means 18 about a first pivot axis 22. The second member 20 includes a second jaw 24 having an article engaging surface in the form of a removable blade 26. The blade 26 is removable to allow replacement when worn or damaged.

First and second jaws 12, 24 are movable relative to each other between an article receiving position and an article breaking position. In the receiving position, the first article supporting surface 14 and the blade 26 diverge away from the first pivot axis 22, and in the breaking position said surface 14 and said blade 26 diverge towards the first pivot axis 22.

Figure 3:
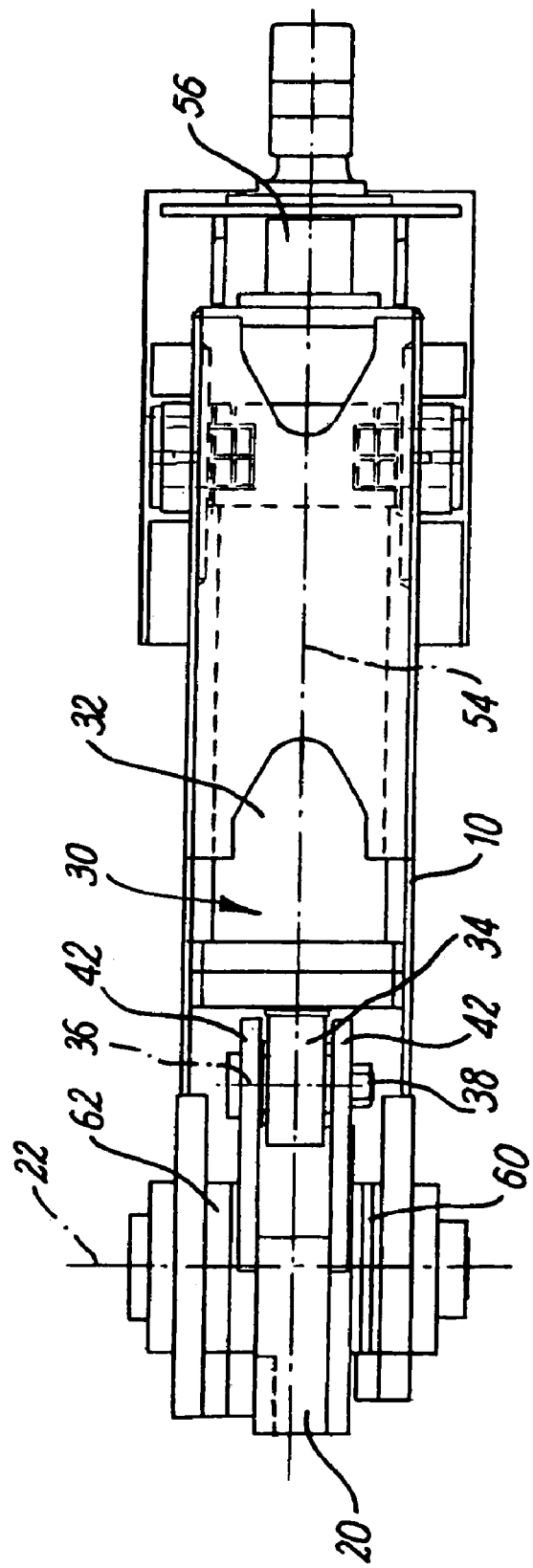
FIG. 3 is a plan view of the apparatus shown in FIG. 1.

As is shown in FIG. 3, first pivot means 18 includes a thrust bearing 60 and an adjusting pad 62 to accommodate any forces directed along the pivot axis 22 during the breaking operation. The apparatus includes moving means for moving the jaws between the receiving and breaking positions, the moving means including a piston and cylinder assembly 30, the cylinder 32 being pivotally mounted on the first member 10. The second member 20 includes a yoke 40 having two arms 42, each arm having an aligned straight slot 44. The free end of the piston 34 of the piston and cylinder assembly 30 includes a pin 38, extending through the slots 44 and slidably mounted therein, thus pivotally connecting the piston 34 to the second member 20 and forming a second pivot axis 36. The longitudinal axes of the slots 44 extend substantially towards the first pivot axis 22.

The first member 10 includes a fixing means 50 for mounting the apparatus on the vehicle arm. The fixing means 50 includes a second pivot means 52 for pivoting the apparatus about a third pivot axis 54. The third pivot axis 54 extends through the first pivot axis 22 and is perpendicular thereto, and extends between the jaws 12, 24 when in the receiving position. The fixing means 50 includes a rotary actuator 56, operable to cause pivoting of the apparatus about the pivot axis 54. The rotary actuator 56 may be electrically powered.

Figure 4:
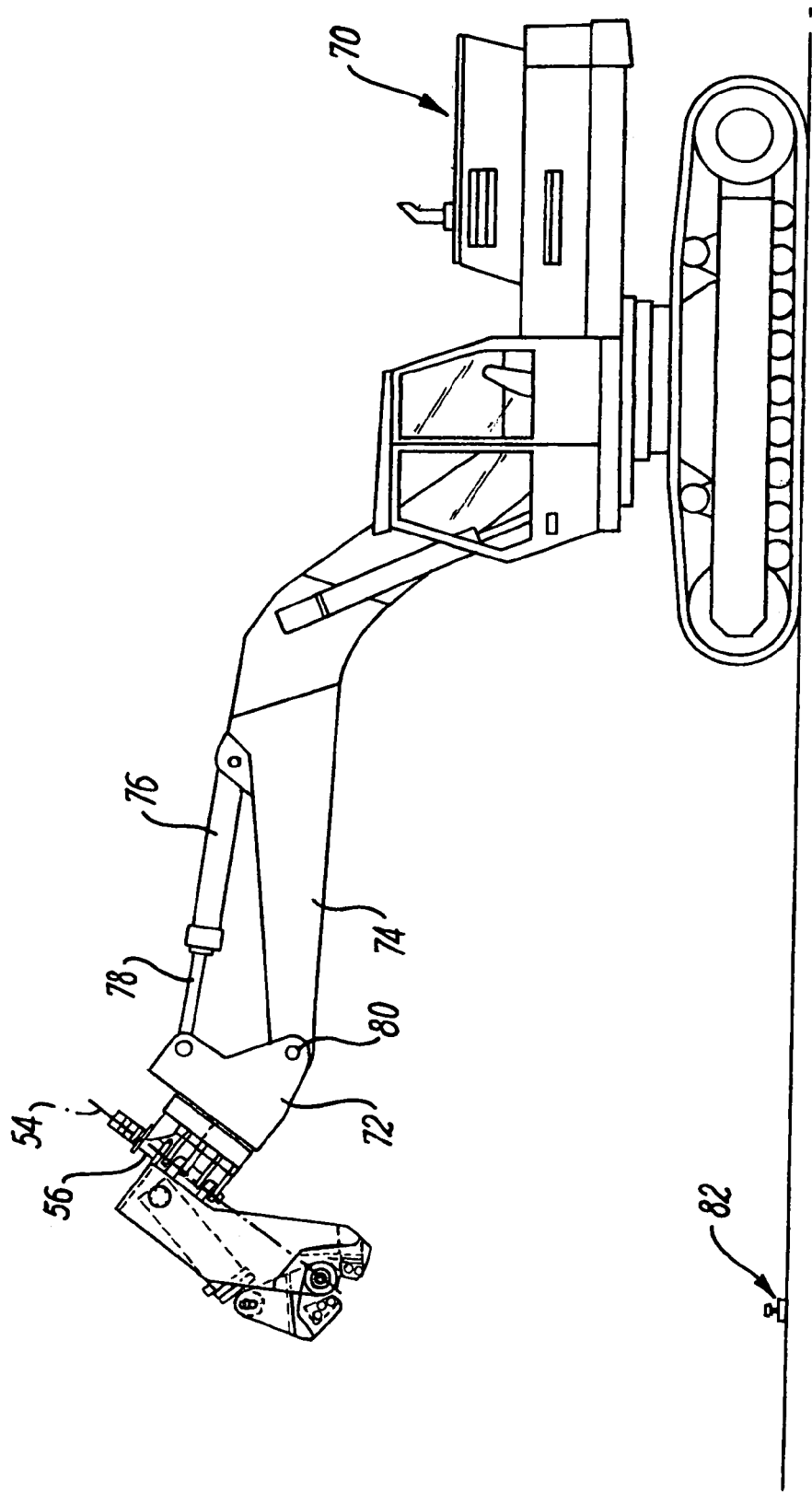
FIG. 4 is a diagrammatic side view on a reduced scale of a suitable vehicle fitted with the article breaking apparatus of FIG. 1.

FIG. 4 shows the apparatus mounted on a mounting means 72 on a vehicle 70. The mounting means 72 is pivotally mounted about a fourth pivot axis 80 on the vehicle arm 74. The cylinder 76 of an hydraulic piston and cylinder assembly is pivotally mounted on the arm 74, with the piston 78 being pivotally connected to the mounting means 72, and operable to pivot the apparatus about the fourth pivot axis 80. The arm 74 may be lowered and raised.

In use, the apparatus is mounted by means of the fixing means 50 on the arm 74 of the vehicle 70 as shown in FIG. 4. Mounted as shown, the apparatus may be raised and lowered with the arm 74, tilted relative to the arm 74 by pivoting around pivot axis 80, and pivoted about the third pivot axis 54 relative to the mounting means 72 by the rotary actuator 56. It will be realized that this freedom of movement allows the apparatus to be easily and conveniently engagable with an article such as a rail 82 which may be on the ground.

The substantial alignment of the third pivot axis 54 with the first pivot axis 22 and the jaws 12, 24 in the receiving position aids the operator since as the apparatus pivots about the third pivot axis 54 the space between the jaws 12, 24 substantially remains in the same position, allowing easy alignment of the jaws 12, 24 with the rail 82. Also, the apparatus is substantially balanced about the third pivot axis 54, making pivoting easier.

FIG. 1 shows the jaws 12, 24 of the apparatus in the article receiving position, and a rail 82 located between the jaws 12, 24. In comparison with the standard rail section, the length of the jaws 12, 24 is less than the height of the rail section, allowing only a portion of the rail between the jaws 12, 24. The rail 82 includes a wearing flange 84 and a base flange 86 interconnected by a web 88.

In a typical situation the rail 82 is on the ground with the wearing flange 84 uppermost. The importance of the length of the jaws 12, 24 relative to the rail height, and the orientation of the surfaces 13, 25 extending perpendicularly to the jaws 14, 24 will now become apparent, since these features allow the apparatus to be positioned over the rail 82 on the ground and the apparatus operated so that the rail 82 is broken on the ground, without requiring lifting or feeding of the rail 82 into the apparatus.

The breaking operation is as follows;

FIG. 1 shows the apparatus in the receiving position, with the first article supporting surface 14 and the blade 26 diverging away from the first pivot axis. A rail 82 is located between the jaws 12, 24, the wearing flange 84 towards the first pivot axis 22 and the second article supporting surface 16.

The hydraulic cylinder and piston assembly 34 is actuated and the piston 34 extends, the pin 38 sliding down the slots 44 towards the first pivot axis 22. At the bottom of the slots 44, the piston 34 continues to extend, pivoting the second member 20 about the first pivot axis 22, and moving the jaws 12, 24 from the receiving position to the breaking position. As the jaws 12, 24 close, the blade 26 and the first article supporting surface 14 change from diverging away from the first pivot axis 22 to diverging towards the first pivot axis 22 as shown in FIG. 2, urging the rail 82 inwardly towards the second supporting surface 16 and the first pivot axis 22. As resistance to the movement of the jaws is encountered, the pin 38 moves upwards in the slots 44 away from the first pivot axis 22, allowing a greater leverage to be applied.

A position is reached in which the wearing flange 84 is in contact with the blade 26 and the first and second article supporting surfaces 14, 16. It will be noticed from FIG. 1 that the blade 26 only contacts the upper side of the wearing flange 84. Although the blade 26 is only acting upon the wearing flange 84, because of the brittleness of the material of the rail, further movement of the blade 26 cracks and breaks the rail 82.

Following breaking of the rail 82, the pin 38 moves down the slots 44 towards the first pivot axis 22, the hydraulic piston and cylinder assembly is actuated to retract the piston 34, and the jaws 12, 24 are moved back from the breaking to the receiving position. The movement of the pin 38 in the slots 44 allows quicker movement of the jaws 12, 24 between the receiving and the breaking positions than would be the case with a fixed pivot connection, and maximizes the leverage available at the breaking position.

There is thus disclosed apparatus allowing the rapid and easy breaking of rails on the ground without the need for positioning or feeding of the rails to the apparatus. Such apparatus may be operated alongside rail tracks and may be mounted on railway trucks or carriages, or on other vehicles operating alongside the rail track. Although the apparatus has been described specifically with reference to rails, it will be realized that it may be used to break any suitable article manufactured from relatively brittle materials such as cast iron or hardened steel. It will also be realized that the apparatus may be used with the apparatus stationary and articles to be broken brought to the apparatus and fed into the jaws for breaking.

Various modifications may be made without departing from the scope of the invention. For example, the size of the jaws may vary to suit different types and sizes of rail. Different means of moving the jaws and/or of pivoting the apparatus about the third pivot axis may be utilized.

A rail breaking apparatus and method are described above. Various details of the invention may be changed without departing from its scope. Furthermore, the foregoing description of the preferred embodiment of the invention and the best mode for practicing the invention are provided for the purpose of illustration only and not for the purpose of limitation—the invention being defined by the claims.

I claim:

1. A railroad rail breaking apparatus for breaking rails of the type having an integrally-formed wearing flange, rail web and base flange, and comprising:
   (a) a first member having a first jaw on a first end thereof, the first jaw including a first hardened rail breaking insert mounted thereon for engaging a first side of the wearing flange;
   (b) a second member pivotally mounted for movement about a pivot axis, the second member including a second jaw having a second hardened rail breaking insert thereon for engaging a second side of the wearing flange opposite the first side of the wearing flange, the first and second inserts being shaped and adapted to receive only a single rail in an orientation for engagement of only the wearing flange of the single rail without engagement with the rail web and base flange;
   (c) the second jaw being movable about the first pivot axis relative to the first jaw between a relatively open, wearing flange receiving position and a rail breaking position in which the first rail breaking insert of the first jaw and the second rail breaking insert of the second jaw hold the wearing flange in a wear breaking position by cooperation of the first and second members;
   (d) power means mounted for cooperation with the first and second members for moving the first and second jaws relative to each other; and
   (e) wherein as the first and second jaws move from the wearing flange receiving position to the wearing flange breaking position, the wearing flange, rail web and base flange of the rail are broken by a breaking force supplied by the power means only to the wearing flange.

2. A railroad rail breaking apparatus for breaking rails of the type having an integrally-formed wearing flange, rail web and base flange, and comprising:
   (a) a first jaw including a first hardened rail breaking insert mounted thereon for engaging a first side of the wearing flange;
   (b) a second jaw mounted relative to the first jaw, and having a second hardened rail breaking insert thereon for engaging a second side of the wearing flange opposite the first side of the wearing flange, the first and second inserts being shaped and adapted to receive only a single rail in an orientation for engagement of only the wearing flange of the single rail without engagement with the rail web and base flange;
   (c) the second jaw mounted for movement relative to the first jaw between a relatively open, wearing flange receiving position and a wear breaking position in which the first rail breaking Insert of the first jaw and the second rail breaking insert of the second jaw hold the wearing flange by cooperation of the first and second members; and
   (d) wherein as the first and second jaws move from the wearing flange receiving position to a wearing flange breaking position, the wearing flange, rail web and base flange of the rail are broken by a breaking force supplied by a piston and cylinder assembly only to the wearing flange.

3. A railroad rail breaking apparatus according to claim 2, wherein the piston and cylinder assembly is powered by a vehicle to which the rail breaking apparatus is attached in use.

4. A railroad rail breaking apparatus according to claim 2, wherein the length of the first jaw and the second jaw is at least the height of the wearing flange of the rail being broken.

5. A railroad rail breaking apparatus according to claim 2, and including rotator means cooperating with the first and second jaw for permitting rotation of the apparatus about an axis perpendicular to an axis of rotation of a first pivot axis.

6. A railroad rail breaking apparatus according to claim 2, in combination with a vehicle having an articulating arm to which the apparatus is attached.

* * * * *